INVENTOR
Hans Sagerer

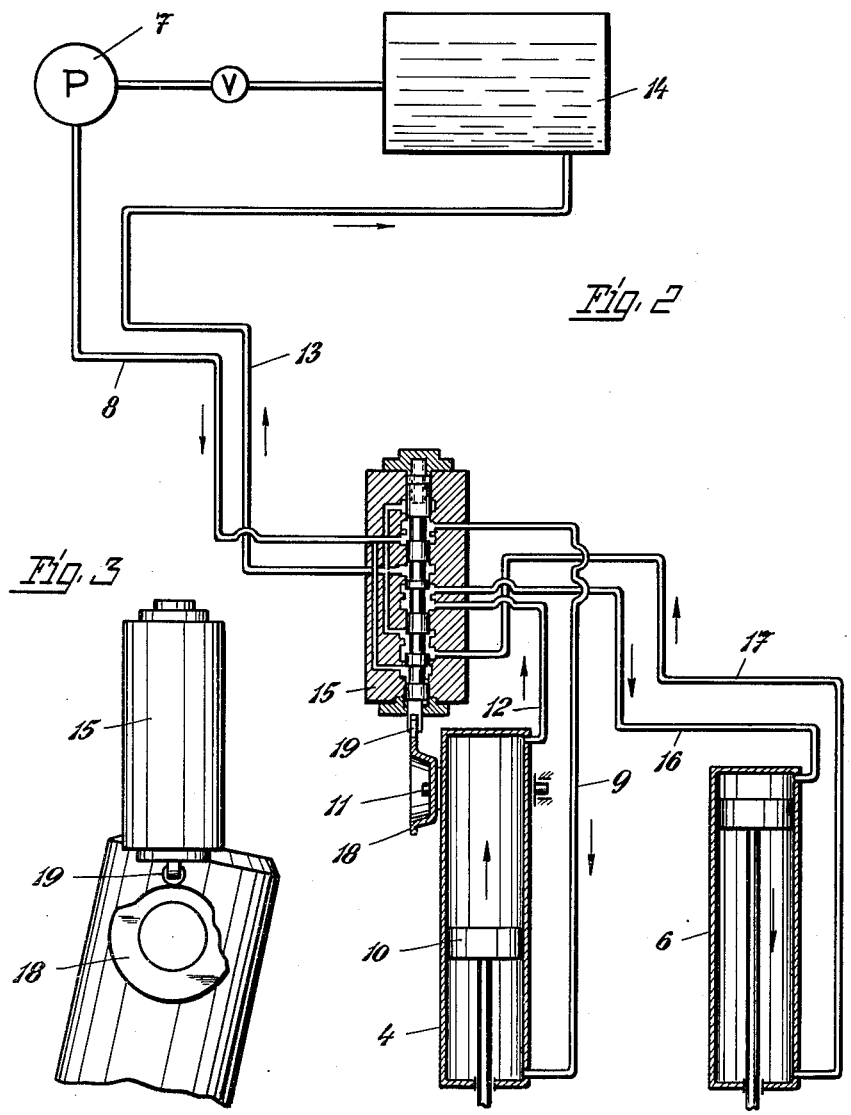

United States Patent Office 3,029,961
Patented Apr. 17, 1962

3,029,961
APPARATUS FOR CONTROLLING THE MOVEMENTS OF A BUCKET ON AN OVERHEAD LOADER
Hans Sagerer, Munich, Germany, assignor to F. X. Meiller Fahrzeug- und Maschinenfabrik K.G., Munich, Germany, a company of Germany
Filed Oct. 14, 1959, Ser. No. 846,283
Claims priority, application Germany Oct. 16, 1958
2 Claims. (Cl. 214—140)

This invention relates to overhead loaders, and more particularly to apparatus for controlling the movements of the bucket of an overhead loader.

An overhead loader essentially consists of a vehicle, usually self-propelled, to which at least one arm is pivoted for movement about a horizontal axis. The free end of the arm carries load-holding means such as a bucket which moves from a loading position at one side of the vehicle in an arc overhead to an unloading position on another side of the vehicle. When the load-holding means has an open top, as in a scoop or bucket, it is desirable that it maintain its inclination during the translatory arcuate movement from the loading to the unloading position to prevent premature discharge of a portion of the load. It is customary to mount the bucket on the arm rotatably about its axis. The desired position of the bucket can then be maintained by a parallelogram arrangement of links connecting the bucket with the vehicle. A simple arrangement of this type is weighty, subject to wear, and not effective when the arms sweep a very wide arc during the transfer of the bucket from the loading to the unloading position. Modifications of the parallelogram link arrangement which permit swinging the bucket through a wide arc are complicated and costly.

The invention aims at overcoming these shortcomings of purely mechanical devices for controlling the inclination of the loading means of an overhead loader. It is a specific object of the invention to provide a simple and reliable method for controlling the rotary movement of the bucket or other loading means during its translatory movement from a loading to an unloading position, and apparatus for performing the method.

Another object is the provision of apparatus for performing the above method which is relatively light in weight, occupies but little space, and is not subject to wear, even when the overhead loader is employed to load abrasive material.

With these and other objects in view, the invention contemplates the use of separate fluid-operated actuating means for actuating the pivotal movement of the loading arm relative to the supporting vehicle, and for actuating rotary movement of the bucket or other load-holding means relative to the arm. A conduit connects the two actuating means in such a manner that return fluid from the first actuating means, which causes movement of the arm relative to the vehicle, is led to the second actuating means for operation of the latter by the fluid and corresponding rotary movement of the bucket. Control means arranged in the conduit control the flow of the return fluid responsive to the angular position of the loading arm relative to the supporting vehicle.

The exact nature of this invention as well as other objects and advantages thereof will be readily apparent from consideration of the following specification relating to the annexed drawing in which:

FIG. 2 shows a sectional side elevation of the control arrangement of the loader of FIG. 1; and FIG. 3 shows a detail of FIG. 2 in front elevation.

Figure 1:
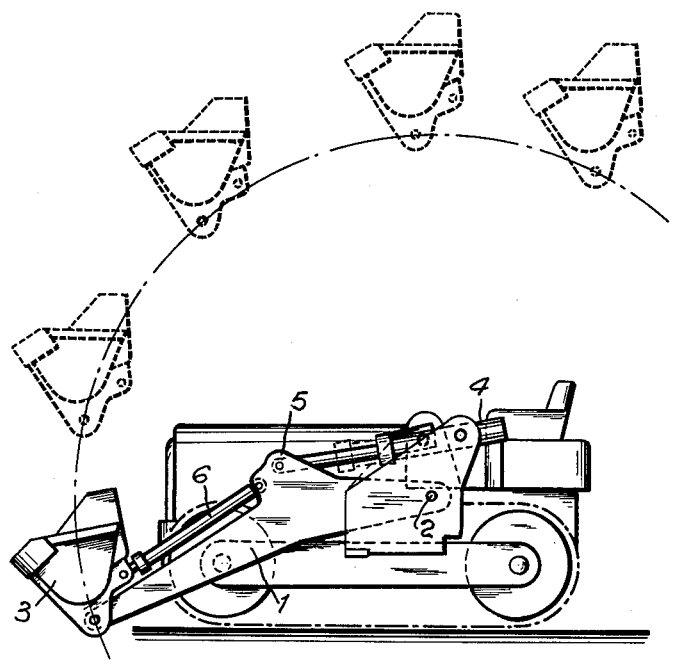
FIG. 1 is a side elevational view of an overhead loader equipped with the control arrangement of the invention, and shows successive positions of the bucket means during translatory movement from the loading to the unloading position.

Referring now to the drawing, and initially to FIG. 1, there is seen a crawler tractor having two arms 1 pivoted thereto by respective pivot pins 2. Only one arm is visible, but it will be understood that a substantially identical second loading arm is arranged on the far side of the tractor. A scoop or bucket 3 is rotatably mounted between the free ends of the arms 1. Two hydraulic actuators 4 are mounted on the tractor in such a manner that each actuator cylinder is pivoted to the tractor frame, and the corresponding actuator piston is pivoted to a laterally extending lug 5 of a respective arm 1. Relative movement of the cylinders and pistons under the force exerted by a hydraulic fluid causes raising or lowering of the bucket 3 along an arcuate path centered on the pivot pin 2.

Two additional hydraulic actuators 6, the cylinders and pistons of which are respectively secured to the arms 1 near the lugs 5, and to the bucket 3 permit the bucket to be rotated on the arms 1. When the rotary movement of the bucket is suitably synchronized with its translatory movement about the pivot pin 2, the inclination of the bucket is substantially maintained from the loading to the unloading position as indicated by the several bucket positions illustrated in FIG. 1.

FIGS. 2 and 3 illustrate the control arrangement of the overhead loader of FIG. 1. A pump 7 drives hydraulic fluid into a pressure line 8 from which it reaches the actuators 4 of the arms 1 through a conduit 9. Since the controls for both arms and the coordinated equipment are virtually identical, only one actuator is illustrated. The pressure fluid enters the space in the cylinder of the actuator 4 under the piston 10, as seen in FIG. 2, and causes the piston to move inward of the cylinder in the direction of the arrow, thereby driving fluid from the cylinder space above the piston 10 into a conduit 12. This return fluid may be directed to a return line 13 and the sump 14 by a piston-type control valve 15.

In the position of the valve 15 shown in FIG. 2, the conduit 12 communicates with a conduit 16 leading to one of the spaces defined in the cylinder of the hydraulic actuator 6 by the double-acting piston which is slidable therein. The return fluid from the actuator 4 thus causes the piston of the actuator 6 to move outward of the corresponding cylinder in the direction of the arrow.

The piston displaces fluid during its movement and drives it into the conduit 17 from which it is directed into the return line 13 and towards the sump 14 by the control valve 15.

The control valve 15 is mounted on the frame of the tractor and is actuated by a rotary cam 18 which cooperates with a cam follower 19 mounted on the piston of the valve 15. The cam 18 is fixedly fastened on a pivot pin 11 by means of which the actuator 4 is journaled in the tractor frame. The cam 18 thus participates in the pivoting movement of the actuator 4. The position of the cam 18 is uniquely coordinated with the angular position of the actuator 4, and therefor also of the arm 1. The movement of the arm 1 or of the actuator 4 thus controls the position of the valve 15.

Referring again to FIG. 1, it is seen that shortening of the hydraulic actuator 4 as by inward movement of its piston into the cylinder raises the loading arm 1 in a clockwise arcuate movement, and that lengthening of the hydraulic actuator 6, as by outward movement of the piston thereof from the corresponding cylinder rotates the bucket in a counterclockwise direction relative to the supporting loading arm 1, as seen in FIG. 1. The two piston movements thus tend to mutually cancel their effects on the inclination of the bucket 3 relative to a desired horizontal position.

As seen from FIG. 1, the path of the bucket 3 in the initial stage of its arcuate translatory movement leads substantially vertically upward. The deviation from a horizontal position of the bucket during this stage is so small as not to require correction.

The cam 18, therefore, has a circumferential portion of smallest diameter. It is associated with the lowest position of the control member of the valve 15 in which the acauator 4 is directly connected to the return line 13, and no return fluid is directed to the actuator 6 which is thereby immobilized. Only after the bucket has reached a portion of its path which is appreciably inclined relative to a vertical line, the valve 15 is shifted by the cam 18 into the position illustrated in FIG. 2.

To maintain the bucket substantially horizontal during its travel, the displacement of the two actuators 4 and 6 may be suitably selected. It is also possible to adjust the control arrangement to different conditions of loading height and other operational variables by replacing the cam 18 which is releasably secured to the pivot 11.

The automatic control of bucket rotation described above does not extend to the rotary movement of the bucket required during the loading and unloading operation in which the bucket 3 may have to be turned through a right angle while the arms 1 stand still. It is preferable to have this movement controlled manually by the operator by means of a valve which connects the actuator 6 directly with the pump 7 and the sump 14 in a well-known manner, and which by-passes the automatic control arrangement.

The pump 7 may be driven by the engine of the tractor as is customary in loaders of this type, and it will be understood that the hydraulic system comprises additional valves and other fittings as required for operation and maintenance purposes. A valve is illustrated between the pump 7 and the sump 14 as illustrative of such conventional auxiliary devices.

While the control arrangement illustrated above is applicable to all overhead loaders, its advantages are particularly important in overhead loaders in which the loading arms sweep a very wide angle, such as in the overhead loader disclosed in my co-pending application, filed simultaneously.

Various modifications are contemplated and may obviously be resorted to by those skilled in the art without departing from the spirit and scope of the invention as hereinafter defined in the appended claims, as only a preferred embodiment thereof has been disclosed.

I claim:
1. In an overhead loader a support, a loading arm pivoted to said support, bucket means rotatably mounted on said arm for arcuate translatory movement of said bucket means relative to said support through an arc greater than 90° in a substantially vertical plane between a loading position and an unloading position of said bucket means, and for rotary movement of said bucket means relative to said arm, first fluid-operated actuating means pivotally secured to said support and to said arm for actuating pivotal movement of said arm on said support through said arc while said actuating means pivots on said support; a cam connected to said actuating means for joint pivotal movement therewith; second fluid-operated actuating means secured to said arm and to said bucket means for actuating rotary movement of the latter; a conduit connecting said fluid-operated actuating means for flow of return fluid from said first actuating means to said second actuating means for operating the latter; and cam-actuated control means in said conduit on said support and cooperating with said cam for controlling the flow of said return fluid to said second actuating means at varying rates during pivotal movement of said cam for actuating continuous rotary movement of said bucket means during translatory movement thereof through said arc.

2. In an overhead loader as set forth in claim 1, pivot pin means journaled in said support, said first actuating means being fixedly fastened to said pivot pin means, and said cam means including a cam disc releasably fastened to said pivot pin.

References Cited in the file of this patent
UNITED STATES PATENTS

| | | |
|---|---|---|
| 2,732,963 | Grubich | Jan. 31, 1956 |
| 2,798,626 | Lapsley | July 9, 1957 |
| 2,879,908 | Andersen | Mar. 31, 1959 |
| 2,883,077 | Pilch | Apr. 21, 1959 |

FOREIGN PATENTS

| | | |
|---|---|---|
| 1,068,273 | France | Feb. 3, 1954 |